(12) United States Patent
McCreight et al.

(10) Patent No.: X9359
(45) Date of Patent: Feb. 5, 1836

(54) GRIST MILL

(76) Inventors: William McCreight; James McCreight

William Mc Creight and James Mc Creight
Letters Patent

The schedule referred to in these Letters Patent and making part of the same containing a description in the words of the said William Mc Creight and James Mc Creight themselves of their improvement in the Grist-Mill.

---

To all to whom these presents shall come. Be it known that we William Mc Creight & James Mc Creight of the town of Winnsboro Fairfield District State of So. Carolina have invented a new & useful improvement in the patent Grist Mill invented by Edward Norman of Guilford Co State of N. Carolina and Patented by him in February 1837 & that the following is a full & exact description of the construction & operation of the machine as improved by us. We claim as our improvement the increased length of the spindle & a new mode of making the regulating bush. The spindle as improved by us is as long as the spindle of the original patented mill & the regulating bush by our improvement is placed in the hopper frame at top. the bush below being only secondary to keep the spindle stiff when in operation. The regulating bush above is made of four pieces of metal or hard wood 3 inches long 3/4 by 5/8 of an inch thick which is fixed in the hopper frame with an iron screw at the back of each piece to tighten the bush up to the spindle when it wears. The bush below is made of four pieces of hard wood 10 inches long 3 by 1½ inches thick let into the bush tree (the end of the wood to the spindle) with a screw at the end of each piece to bring the bush up to the spindle as it wears an iron bolt with a head through each piece with a tap below to keep the pieces firm & steady. From this improvement the stones are kept more easily parallel with each other which is all important in grinding & the bushes are so completely fixed that they seldom or never get out of order. in fact the mill is so completely fixed in its frame that it is almost impossible to put it out of order. The above described improvements we claim as our invention being calculated to make the said mill more easily kept in order & expedite the grinding by keeping the stones always parallel & steady.

Witnesses John B. McCall
Robt. Cathcart

William Mc Creight
Jas Mc Creight [illegible]